United States Patent [19]

Sutoh et al.

[11] 4,350,286
[45] Sep. 21, 1982

[54] HUMIDITY CONTROL APPARATUS

[75] Inventors: Shinji Sutoh, Konan; Takeshi Harada; Shinichi Kaneko, both of Higashi Matsuyama, all of Japan

[73] Assignee: Diesel Kiki Company, Ltd., Tokyo, Japan

[21] Appl. No.: 179,314

[22] Filed: Aug. 18, 1980

[30] Foreign Application Priority Data

Aug. 20, 1979 [JP] Japan .................................. 54-105677

[51] Int. Cl.$^3$ .......................... G05D 21/00; F24F 7/00
[52] U.S. Cl. ................................ 236/44 A; 236/46 F; 236/49; 165/21
[58] Field of Search ................ 165/16, 20, 21; 62/92, 62/176, 91; 236/44, 46 R, 46 F, 49

[56] References Cited

U.S. PATENT DOCUMENTS 1,751,806  3/1930  Fleisher ........................... 236/44 C
3,979,922  9/1976  Shavit ............................... 165/16 X
4,146,775  3/1979  Kirchner et al. ................. 165/21 X Primary Examiner—Albert J. Makay
Assistant Examiner—Harry Tanner
Attorney, Agent, or Firm—David G. Alexander

[57] ABSTRACT

A proportion of outside air to recirculated air is reduced when a sensed humidity in a vehicle compartment (14) drops below a first predetermined value. If the humidity is still below the first predetermined value after a certain amount of time has elapsed, a humidifier (24) is turned on. Conversely, if the humidity rises above a second predetermined value which is higher than the first predetermined value, the humidifier (24) is turned off. If the humidity is still above the second predetermined value after a certain length of time has elapsed, the proportion of outside air to recirculated air is increased.

9 Claims, 5 Drawing Figures

HUMIDITY CONTROL APPARATUS

BACKGROUND OF THE INVENTION

The present invention relates to a humidity control apparatus for a vehicle passenger compartment or the like.

It is known to provide a humidifier in a vehicle passenger compartment. However, control of the humidity heretofore has been poor and prior art humidifiers consume excessive amounts of electrical power and water.

SUMMARY OF THE INVENTION

An apparatus for controlling a humidity in an enclosure embodying the present invention includes duct means having an outlet opening into the enclosure, a recirculated air inlet communicating with the enclosure and an outside air inlet, proportioning means for controlling a proportion of air entering the duct means from the outside air inlet relative to air entering the duct means from the recirculated air inlet and humidifier means for, when energized, increasing humidity in the enclosure, and is characterized by comprising humidity sensor means for sensing the humidity in the enclosure, and control means responsive to the humidity sensor means and constructed to, when the humidity drops below a first predetermined value, control the proportioning means to set said proportion to a predetermined low value and, after a predetermined length of time has subsequently elapsed and only if the humidity is below a second predetermined value, energize the humidifier means, and; when the humidity rises above a third predetermined value which is higher than the first predetermined value, de-energize the humidifier means and, after a predetermined length of time has subsequently elapsed and only if the humidity is above a fourth predetermined value, control the proportioning means to set said proportion to a predetermined high value.

In accordance with the present invention, a proportion of outside air to recirculated air is reduced when a sensed humidity in a vehicle compartment drops below first predetermined value. If the humidity is still below the first predetermined value after a certain amount of time has elapsed, a humidifier is turned on. Conversely, if the humidity rises above a second predetermined value which is higher than the first predetermined value, the humidifier is turned off. If the humidity is still above the second predetermined value after a certain length of time has elapsed, the proportion of outside air to recirculated air is increased.

It is an object of the present invention to provide an improved humidity control apparatus for an enclosure such as a motor vehicle passenger compartment which enables accurate humidity control and uses only small amounts of electrical power and water.

It is another object of the present invention to provide a generally improved humidity control apparatus.

Other objects, together with the foregoing, are attained in the embodiments described in the following description and illustrated in the accompanying drawing.

DESCRIPTION OF THE PREFERRED EMBODIMENTS

While the humidity control apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
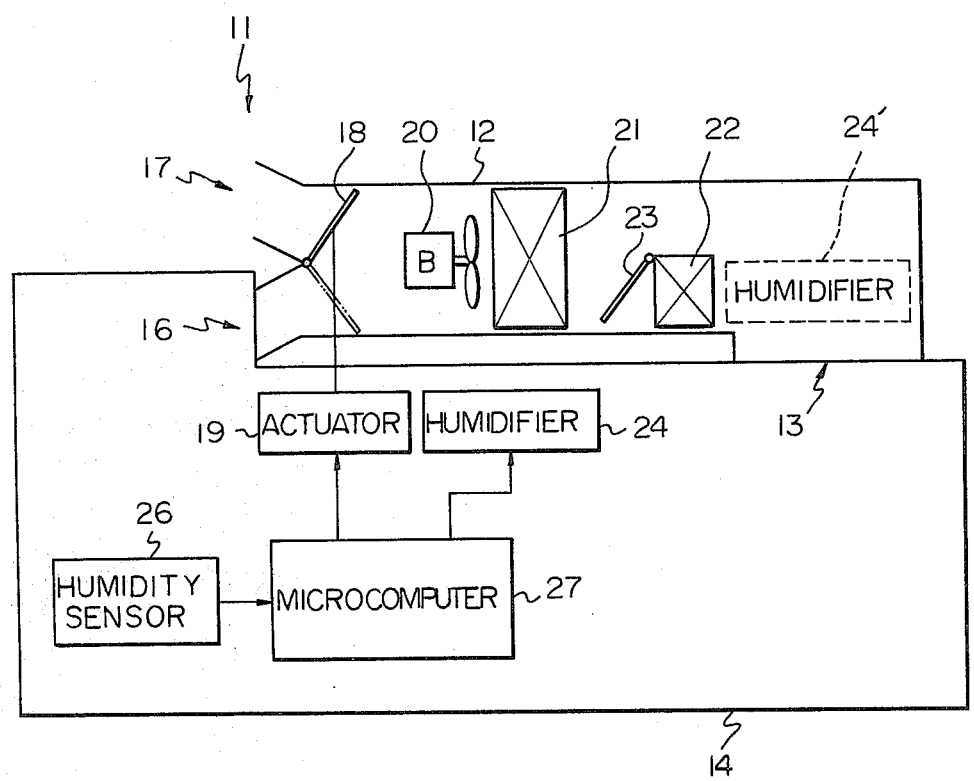
FIG. 1 is a schematic diagram of a humidity control apparatus embodying the present invention.

Referring now to FIG. 1 of the drawing, a humidity control apparatus embodying the present invention is generally designated by the reference numeral 11 and comprises a duct 12. The duct 12 has an outlet 13 opening into an enclosure 14 such as a passenger compartment of a motor vehicle and a recirculated air inlet 16 which communicates with the enclosure 14. The duct 12 further has an outside air inlet 17 and a proportioning door or damper 18 which is movable by an actuator 19 to control air flow through the inlets 16 and 17. Air is forced to flow through the duct 12 from the inlets 16 and 17 to the outlet 13 by a blower 20. An evaporator or cooler core 21 is disposed in the duct 12 and a heater core 22 is also disposed in the duct 12 downstream of the cooler core 21. A temperature control door or damper 23 is movable to control air flow through and around the heater core 22 and thereby the temperature of air flowing through the duct 12.

A humidifier 24 is provided either inside the enclosure 14 or inside the duct 13 as indicated in phantom line at 24'. The humidifier 24 typically comprises a water tank and an ultrasonic element which may be electrically energized to cause the water in the tank to vaporize and increase the ambient humidity, although not illustrated in detail. A humidity sensor 26 for sensing the humidity in the enclosure 14 is connected to an input of a microcomputer 27. The actuator 19, which may be of the electrically controlled vacuum, pressure or pulse motor type as well as the humidifier 24 is controlled by the microcomputer 27. The microcomputer 27 comprises a central processing unit, a read only memory for storing an operating program, a random access memory for storing intermediate data and an input-output interface although not illustrated in detail.

The operation of the present invention will now be described in detail with reference being made to the flowchart of FIG. 2.

Assuming that the range of comfort is between 30% and 40% relative humidity, the microcomputer 27 determines, based on the output of the sensor 26, whether the sensed humidity is inside or outside of this range. If the humidity is below 30%, the microcomputer 27 by means of the actuator 19 moves the door 18 to a position such that the proportion of outside air to recirculated air entering the duct 12 is 30%. This has the effect of increasing the humidity in the enclosure 14.

After five minutes have elapsed and the humidity rises above 30%, the humidifier 24 is de-energized. If the humidity is still below 30%, the humidifier 24 is energized.

If the humidity is above 40%, the humidifier 24 is de-energized. If, after five minutes the humidity is still above 40%, the door 18 is moved to completely block the recirculated air inlet 16 so that the proportion of outside air to recirculated air is 100%. This has the effect of yet further reducing the humidity in the enclosure 14.

Figure 2:
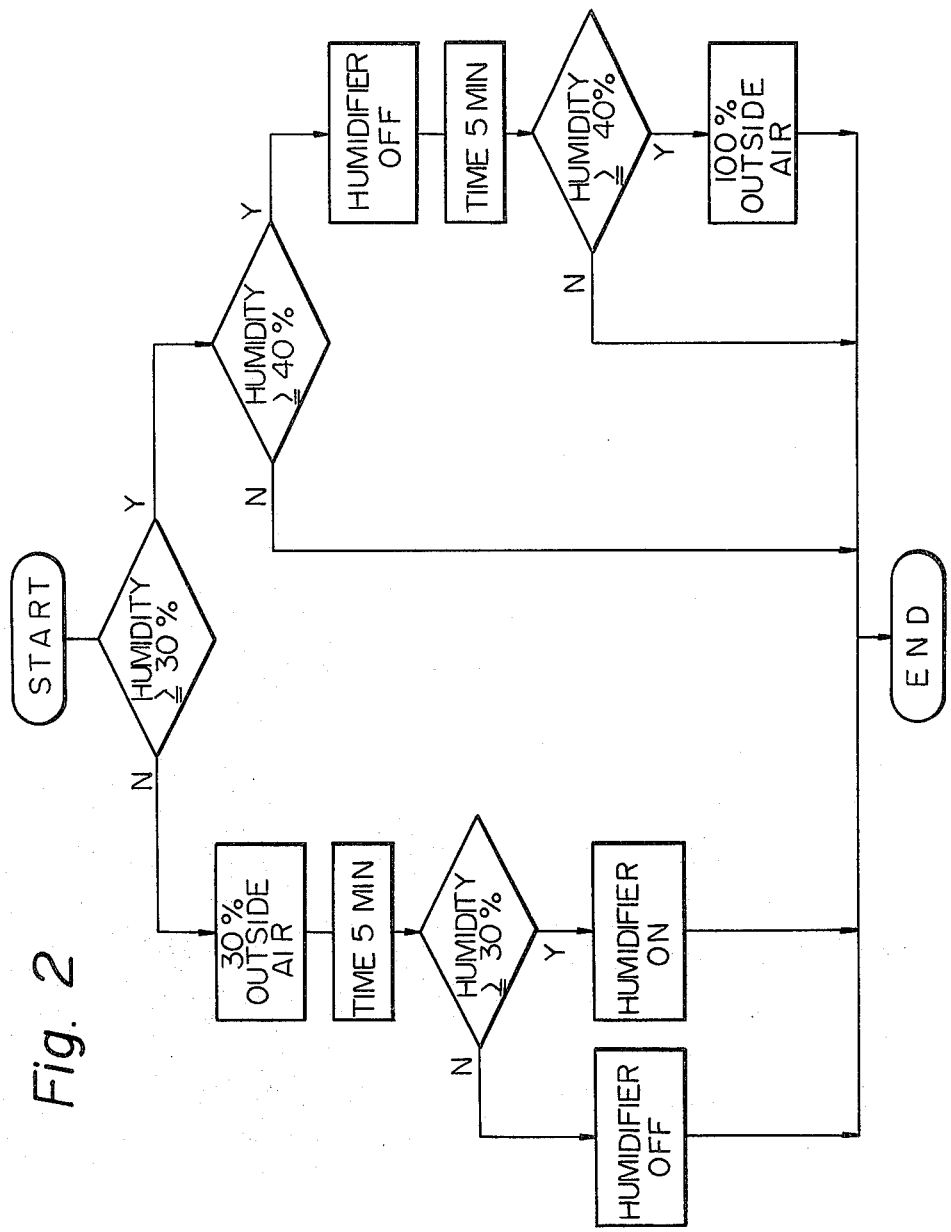
FIG. 2 is a flowchart of the operation of the apparatus.

The operations of FIG. 2 are periodically performed by the microcomputer 27 under program control to maintain the humidity in the comfortable range of 30% to 40%. It will be understood that the combined operation of the humidifier 24 and door 18 provides greatly improved humidity control over the prior art and minimizes the consumption of electrical power and water.

Figure 3:
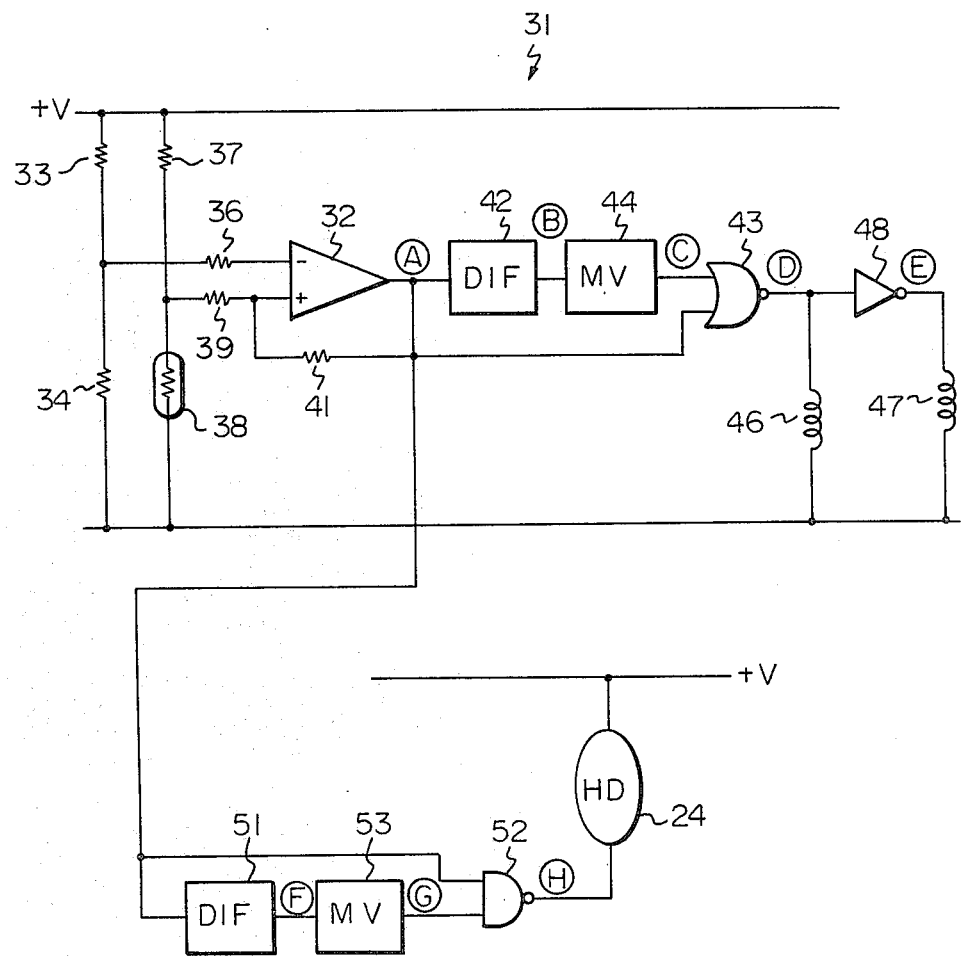
FIG. 3 is an electrical schematic diagram of another humidity control apparatus embodying the present invention.

Another embodiment of the present invention using discrete components rather than a microcomputer is illustrated in FIG. 3. A humidity control apparatus 31 comprises an operational amplifier 32 connected to function as a voltage comparator with hysterisis. A fixed reference voltage is applied to the inverting input of the amplifier 32 by a voltage divider consisting of resistors 33 and 34. The reference voltage is applied to the inverting input of the amplifier 32 through an input resistor 36. Another voltage divider comprises a resistor 37 and a humidity sensor 38, the junction of these elements being connected to the non-inverting input of the amplifier 32 through an input resistor 39. Hysterisis is provided by a resistor 41 connected between the output and non-inverting input of the amplifier 32.

The output of the amplifier 32 is connected to a differentiator 42 and an input of a NOR gate 43. The output of the differentiator 42 is connected to a monostable multivibrator 44 having a period of five minutes and an output connected to another input of the NOR gate 43. The output of the NOR gate 43 is connected to ground directly through a solenoid 46 and also to ground through an inverter 48 and solenoid 47. The solenoid 46, when energized, moves the door 18 to set the proportion of outside air to recirculated air to 100%. The solenoid 47, when energized, moves the door 18 to set the proportion of outside air to recirculated air to 30%.

The output of the amplifier 32 is also connected to inputs of a differentiator 51 and a NAND gate 52. The output of the differentiator 51 is connected to a monostable multivibrator 53 having a period of five minutes and an ouput connected to an input of the NAND gate 52. The ouput of the NAND gate 52 is connected through the humidifier 24 to a positive source +V.

Figure 4:
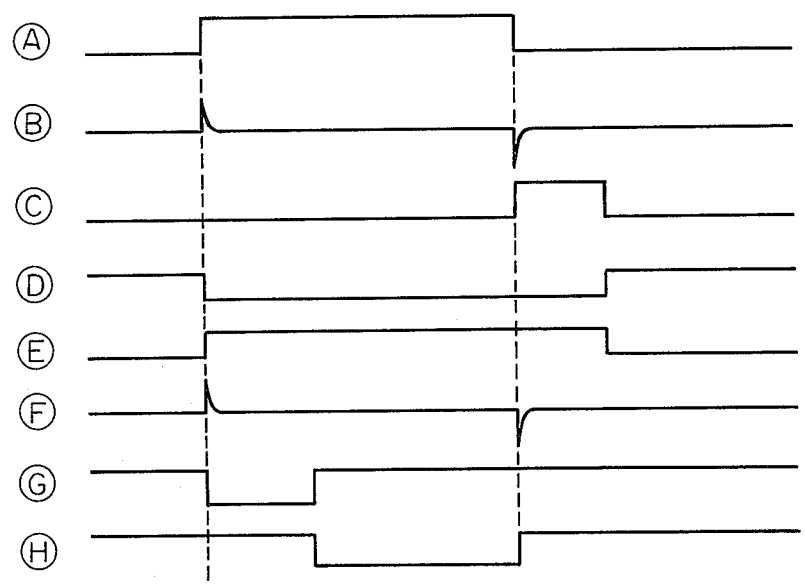
FIG. 4 is a timing diagram of the apparatus of FIG. 3.
Figure 5:
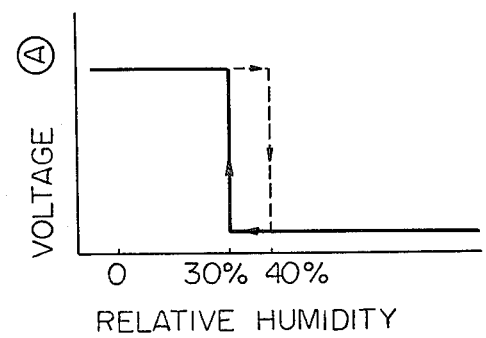
FIG. 5 is a diagram illustrating the operation of a sensor of the apparatus.

The voltages at various circuit points are labeled as A to H respectively and illustrated in FIG. 4. The output of the amplifier 32 is shown in FIG. 5. When the humidity rises above 40%, the output of the amplifier 24 goes low. When the humidity falls below 30%, the output of the amplifier 24 goes high. Thus, the amplifier 24 has a hysterisis or dead range between 30% and 40% relative humidity.

When the humidity goes below 30%, the output of the amplifier 32 goes high. The output of the NOR gate 43 goes low and energizes the solenoid 47 through the inverter 48. This sets the proportion of outside air to recirculated air to 30%.

The rising edge of the output of the amplifier 32 is differentiated by the differentiator 51 to produce a spike which triggers the multivibrator 53. The output of the multivibrator 53 goes low and inhibits the NAND gate 52 which produces a high output which de-energizes the humidifier 24. If the humidity rises above 30% within five minutes, which is the period of the multivibrator 53, the humidifier 24 will remain de-energized. However, if the humidity is still below 30% after five minutes, the output of the multivibrator 53 will go high and the output of the NAND gate 52 will go low to turn on the humidifier 24.

Conversely, if the humidity goes above 40%, the output of the amplifier 32 will go low and the output of the NAND gate 52 will go high to turn off the humidifier 24. The falling output of the amplifier 32 will cause the differentiator 42 to produce a spike which will trigger the multivibrator 44. The multivibrator 44 will produce a high output for five minutes causing the output of the NOR gate 43 to remain low and energize the solenoid 47 for 30% outside air. After five minutes, if the humidity has dropped below 40%, the solenoid 47 will remain energized for 30% outside air. However, if the humidity is still above 40%, the output of the multivibrator 44 will go low and the output of the NOR gate 43 will go high to energize the solenoid 46 for 100% outside air.

In summary, it will be seen that the present invention overcomes the drawbacks of the prior art and provides improved humidity control together with reduced consumption of electrical power and water. Various modifications will become possible for those skilled in the art after receiving the teachings of the present disclosure without departing from the scope thereof. For example, the hysterisis characteristic of the amplifier 32 may be eliminated and the apparatus adapted to operate on only one limit value of humidity. It is also within the scope of the present invention to adapt the apparatus to slightly overshoot or hunt about the hysterisis range in both directions.

What is claimed is:

1. An apparatus for controlling a humidity in an enclosure including duct means having an outlet opening into the enclosure, a recirculated air inlet communicating with the enclosure and an outside air inlet, proportioning means for controlling a proportion of air entering the duct means from the outside air inlet relative to air entering the duct means from the recirculated air inlet and humidifier means for, when energized, increasing a humidity in the enclosure, characterized by comprising:

humidity sensor means for sensing the humidity in the enclosure; and control means responsive to the humidity sensor means and constructed to, when the humidity drops below a first predetermined value, control the proportioning means to set said proportion to a predetermined low value and, after a predetermined length of time has subsequently elapsed and only if the humidity is below a second predetermined value, energize the humidifier means, and; when the humidity rises above a third predetermined value which is higher than the first predetermined value, de-energize the humidifier means and, after a predetermined length of time has subsequently elapsed and only if the humidity is above a fourth predetermined value, control the proportioning means to set said proportion to a predetermined high value.

2. An apparatus as in claim 1, in which the predetermined low value is 30%.

3. An apparatus as in claim 1, in which the predetermined high value is 100%.

4. An apparatus as in claim 1, in which the control means comprises a microcomputer.

5. An apparatus as in claim 1, further comprising temperature control means disposed in the duct means for controlling a temperature of air passing therethrough.

6. An apparatus as in claim 1, further comprising blower means disposed in the duct means for causing air flow therethrough from the inlets to the outlet.

7. An apparatus as in claim 1, in which the humidifier means is disposed in the duct means.

8. An apparatus as in claim 1, in which the humidifier means is disposed in the enclosure.

9. An apparatus as in claim 1, in which the second predetermined value equals the first predetermined value and the fourth predetermined value equals the third predetermined value.

* * * * *